US009321954B2

(12) United States Patent
Vo et al.

(10) Patent No.: US 9,321,954 B2
(45) Date of Patent: Apr. 26, 2016

(54) CONSOLIDATION COMPOSITIONS FOR USE IN SUBTERRANEAN FORMATION OPERATIONS

(71) Applicant: Halliburton Energy Services, Inc., Houston, TX (US)

(72) Inventors: Loan K. Vo, Houston, TX (US); Philip D. Nguyen, Houston, TX (US); James William Ogle, Spring, TX (US); Feng Liang, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/382,562

(22) PCT Filed: Nov. 6, 2013

(86) PCT No.: PCT/US2013/068740
§ 371 (c)(1),
(2) Date: Sep. 3, 2014

(87) PCT Pub. No.: WO2015/069236
PCT Pub. Date: May 14, 2015

(65) Prior Publication Data
US 2015/0122494 A1    May 7, 2015

(51) Int. Cl.
*C09K 8/575*   (2006.01)
*C09K 8/80*   (2006.01)
*E21B 43/267*   (2006.01)

(52) U.S. Cl.
CPC ............. *C09K 8/5753* (2013.01); *C09K 8/5755* (2013.01); *C09K 8/805* (2013.01); *E21B 43/267* (2013.01)

(58) Field of Classification Search
CPC .... E21B 3/267; C09K 8/5753; C09K 8/5755; C09K 8/805; C09K 8/80
USPC ............................. 166/380.1, 285, 281, 280.2
See application file for complete search history.

(56) References Cited

U.S. PATENT DOCUMENTS

| | | | |
|---|---|---|---|
| 3,960,801 A * | 6/1976 | Cole et al. ...................... | 523/130 |
| 6,103,853 A | 8/2000 | Dougherty et al. | |
| 6,140,419 A | 10/2000 | Barglik-Chory et al. | |
| 6,439,309 B1 * | 8/2002 | Matherly et al. .............. | 166/276 |
| 6,962,200 B2 | 11/2005 | Nguyen et al. | |
| 7,114,570 B2 | 10/2006 | Nguyen et al. | |
| 7,264,052 B2 | 9/2007 | Nguyen et al. | |
| 7,306,037 B2 | 12/2007 | Nguyen et al. | |
| 7,407,010 B2 | 8/2008 | Rickman et al. | |
| 7,448,451 B2 | 11/2008 | Nguyen et al. | |
| 2005/0257929 A1 | 11/2005 | Nguyen et al. | |
| 2007/0087206 A1 | 4/2007 | Soutar et al. | |
| 2008/0196897 A1 * | 8/2008 | Nguyen ........................ | 166/295 |
| 2009/0264323 A1 * | 10/2009 | Altherr et al. .................. | 507/221 |
| 2010/0120944 A1 * | 5/2010 | Ballard ......................... | 523/130 |
| 2010/0160187 A1 | 6/2010 | Nguyen et al. | |
| 2014/0190700 A1 * | 7/2014 | Tang et al. ..................... | 166/307 |

FOREIGN PATENT DOCUMENTS

WO    2015069236 A1    5/2015

OTHER PUBLICATIONS

International Search Report and Written Opinion for PCT/US2013/068740 dated Aug. 13, 2014.

* cited by examiner

*Primary Examiner* — Doug Hutton, Jr.
*Assistant Examiner* — Silvana Runyan
(74) *Attorney, Agent, or Firm* — McDermott Will & Emery LLP; Craig W. Roddy

(57) ABSTRACT

Methods comprising providing a consolidation composition comprising the reaction product of a liquid curable resin and a liquid curing agent, wherein the liquid curable resin is an epoxy-functionalized alkoxysilane and wherein the liquid curing agent is selected from the group consisting of: a polyamine; a hydrophobically modified polyamine; a polyimine; a hydrophobically modified polyimine; a polyalcohol; hydrophobically modified polyacrylamide; a hydrophobically modified polyacrylate; and any combination thereof; coating proppant particulates with the consolidation composition, thereby creating coated proppant particulates; introducing the coated proppant particulates into a subterranean formation and placing the coated proppant particulates into a fracture therein; and curing the consolidation composition so as to consolidate the coated proppant particulates in the fracture and form a proppant pack therein.

20 Claims, 1 Drawing Sheet

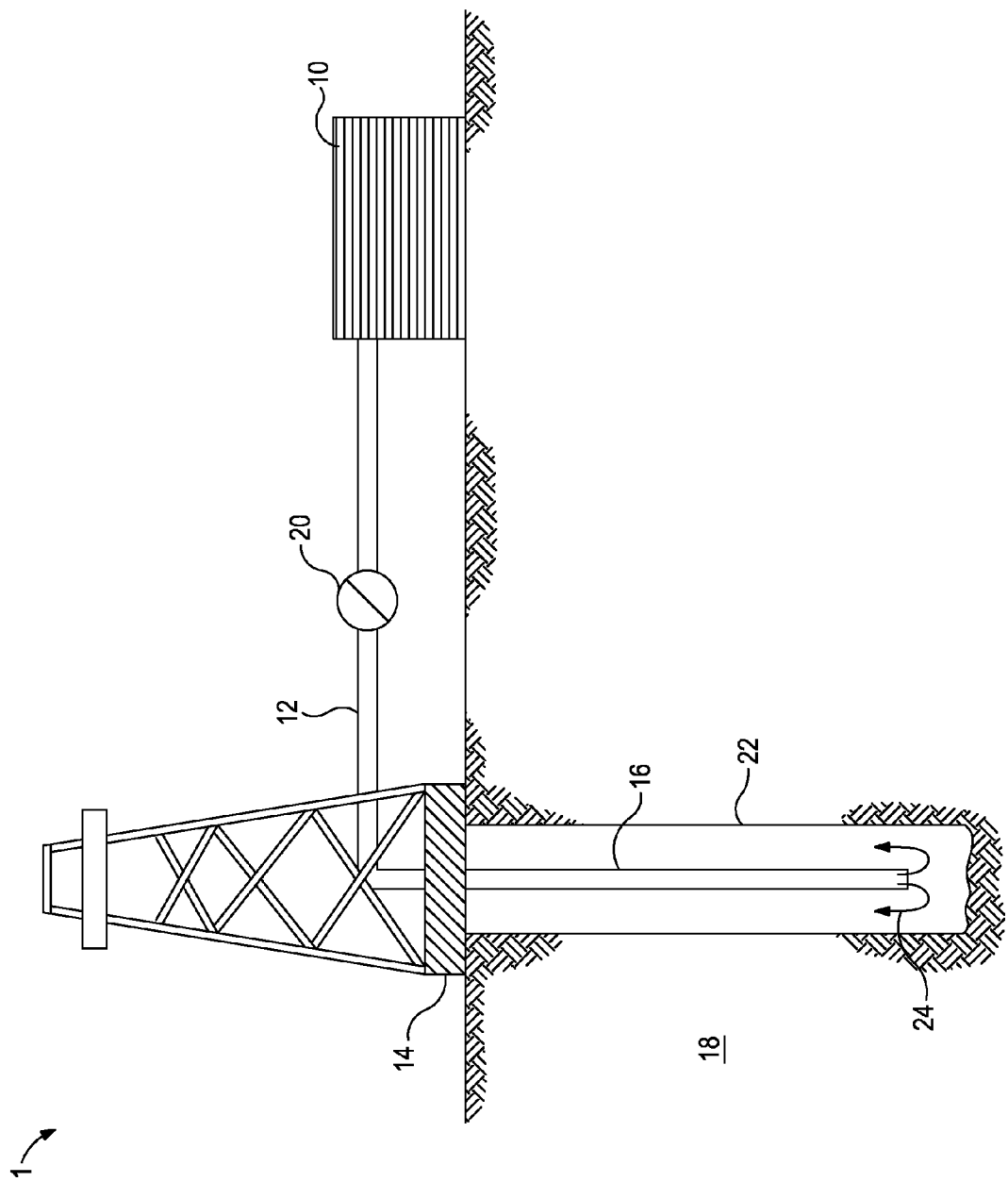

CONSOLIDATION COMPOSITIONS FOR USE IN SUBTERRANEAN FORMATION OPERATIONS

BACKGROUND

The embodiments herein relate to consolidation compositions for use in subterranean formation operations.

Subterranean wells are often stimulated by hydraulic fracturing treatments. In hydraulic fracturing treatments, a viscous treatment fluid may be pumped into a portion of a subterranean formation at a rate and pressure such that the subterranean formation breaks down and one or more fractures are formed. Typically, particulate solids, such as graded sand, are introduced into the subterranean formation in a portion of the treatment fluid and deposited into the fracture. These particulate solids, (generally known as "proppant particulates" or, simply, "proppant") serve to prop the fracture open (e.g., keep the fracture from fully closing) after the hydraulic pressure is removed. By keeping the fracture from fully closing, the proppants aid in forming conductive paths through which produced fluids, such as hydrocarbons, may flow.

Hydraulic fracturing of subterranean wells is often performed in formations that contain unconsolidated particulates. The unconsolidated particulates may migrate out of the subterranean formation and be produced with production fluids. The presence of unconsolidated particulates in a formation during production is undesirable because they may damage or abrade producing equipment or reduce well production. For example, unconsolidated particulates may migrate into wellbore casings, perforations, or the interstitial spaces between packed proppants within a fracture and clog or hinder well production. As used herein, the term "unconsolidated particulates" refers to any loose or loosely bonded particulates that may move through the formation with wellbore fluids (e.g., production fluids). Unconsolidated particulates may include, for example, sand, gravel, proppant particulates, and/or formation fines.

One method of controlling unconsolidated particulates in hydraulic fractured subterranean formations is to perform a gravel-packing treatment. In gravel-packing treatments, particulates are deposited into unconsolidated or weakly consolidated formation zones to create a physical barrier to the transport of unconsolidated particulates with produced fluids. Typical gravel-packing treatments include placing a screen in a wellbore and packing the annulus between the screen and the wellbore with particulates of a certain size to prevent the transport of unconsolidated particulates with the produced fluids without compromising the conductivity of the well. Gravel-packing treatments, however, involve placement of additional unconsolidated particulates into the wellbore which may not be adequately maintained, for example, by a screen and which may, therefore, migrate along with the produced fluids.

Another method of controlling unconsolidated particulates is to treat the wellbore with a consolidating agent. In such treatments, a consolidating agent is placed into the wellbore in order to stabilize unconsolidated particulates, such as by contacting unconsolidated particulates and curing into a hardened mass. Typically, the consolidating agent may be used to lock unconsolidated particulates in place and form at least a partially immobilized substance, which may be accomplished by enhancing grain-to-grain or grain-to-formation contact of the unconsolidated particulates.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the consolidation compositions of the embodiments described herein to a downhole location.

DETAILED DESCRIPTION

The embodiments herein relate to consolidation compositions for use in subterranean formation operations. Specifically, the embodiments herein provide novel consolidation compositions for treating unconsolidated particulates in a subterranean formation that is capable of hardening to lock the unconsolidated particulates in place. In some embodiments, the consolidation composition may comprise a two component system of a liquid curable resin and a liquid curing agent, wherein the liquid curable resin is an epoxy-functionalized alkoxysilane and wherein the liquid curing agent is selected from the group consisting of a polyamine; a hydrophobically modified polyamine; a polyimine; a hydrophobically modified polyimine; a polyalcohol; hydrophobically modified polyacrylamide/polyacrylate and any combination thereof.

Although some embodiments described herein are illustrated by reference to hydraulic stimulation treatments, the consolidation compositions disclosed herein may be used in any subterranean formation operation that may benefit from consolidation of particulates. Such treatment operations may include, but are not limited to, a drilling operation; a stimulation operation; an acidizing operation; an acid-fracturing operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; a remedial operation; a near-wellbore consolidation operation; a plug and abandonment operation; and any combination thereof.

Moreover, the consolidation compositions described herein may be used in any non-subterranean operation that may benefit from their consolidation properties. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

Some embodiments described herein include a method of providing a consolidation composition comprising the reaction product of a liquid curable resin and a liquid curing agent, wherein the liquid curable resin is an epoxy-functionalized alkoxysilane and wherein the liquid curing agent is selected from the group consisting of a polyamine; a hydrophobically modified polyamine; a polyimine; a hydrophobically modified polyimine; a polyalcohol; hydrophobically modified polyacrylamide; a hydrophobically modified polyacrylate; and any combination thereof. The coated proppant particulates are introduced into a subterranean formation and placed into a fracture therein, where the consolidation composition cures and consolidates the coated proppant particulates in the fracture to form a proppant pack therein. As used herein, the term "proppant pack" refers to a collection of a mass of proppant particulates within a fracture or open space in a subterranean formation.

In those embodiments in which proppant particulates are coated with the consolidation compositions described herein, the consolidation composition may be either dry-coated or wet-coated onto the proppant particulates. A combination of dry-coating and wet-coating may also be employed, wherein either the liquid curable resin or the liquid curing agent is dry-coated onto the proppant particulates and the other is wet-coated onto the proppant particulates. In some embodiments, the proppant particulates may be coated prior to introducing them into the subterranean formation (i.e., forming coated proppant particulates before introducing them into the formation). In other embodiments, the proppant particulates may be coated with the consolidation composition on-the-fly simultaneously as the proppant particulates are introduced into the subterranean formation by placing the proppant particulates and the consolidation composition into a treatment fluid and allowing the proppant particulates to become coated with the consolidation compositions as the treatment fluid is introduced into the subterranean formation. As used herein, the term "on-the-fly" refers to performing an operation during a subterranean treatment that does not require stopping normal operations. In some embodiments, the treatment fluid comprising the consolidation compositions and/or proppant particulates coated or to be coated with the consolidation compositions described herein may be introduced into the subterranean formation at a rate and pressure sufficient to create or enhance the fracture.

Some embodiments herein provide a method of providing a portion of a subterranean formation comprising unconsolidated particulates and introducing the consolidation compositions described herein into the subterranean formation so as to contact the unconsolidated particulates with the consolidation composition and coat the unconsolidated particulates. The consolidation composition is then cured so as to consolidate the unconsolidated particulates. In some embodiments, the unconsolidated particulates are proppant particulates in a proppant pack in a fracture in the subterranean formation.

In some embodiments, the two components of the consolidation compositions described herein may be introduced separately into the subterranean formation, where they react together within the subterranean formation to form the consolidation composition, which may coat unconsolidated particulates or proppant particulates therein. In some embodiments, a tool, such as a hydrojetting tool may be used to ensure that the two components do not react until a certain treatment interval is reached in the subterranean formation. For example, either the liquid curable resin or the liquid curing agent may be introduced through the hydrojetting tool and the other component may be introduced through the annulus between the hydrojetting tool and the subterranean formation, such that they are separated as they are introduced into the formation and can only react upon contacting the two fluids together.

The consolidation compositions and/or coated proppant particulates may be introduced into a subterranean formation as a pill. As used herein, the term "pill" refers to a relatively small volume of a specially prepared fluid for use in a subterranean formation operation.

The consolidation compositions described herein may comprise a liquid curable resin and a liquid curing agent. The liquid curable resin may permit or promote binding to proppant particulates and/or unconsolidated particulates. The liquid curing agent may serve to cure or harden the consolidation compositions, thereby locking in place proppant particulates and/or unconsolidated particulates. In some embodiments, depending on the type of liquid curing agent selected, the liquid curing agent may act with the liquid curable resin to promote the binding of the consolidation composition to proppant particulates and/or unconsolidated particulates. The consolidation compositions described herein may cure to form a cohesive, flexible, and potentially permeable mass that immobilizes particulates (e.g., proppant particulates and/or unconsolidated particulates).

The liquid curable resin may be an epoxy-functionalized alkoxysilane with the formula $R_nR'_mSiX_{(4-n-m)}$, wherein R is a nonhydrolysable organic group; R' is a nonhydrolysable organic group functionalized with an epoxy group; X is a hydrolysable group; n is an integer between 0 and 4; and m is an integer between 0 and 4. In some embodiments, it may be preferred that the epoxy group is located at the terminal position; however, in other embodiments, the epoxy group may be located in an internal position relative to the R' nonhydrolysable organic group. The nonhydrolysable organic group for use in the nonhydrolysable organic group R and the nonhydrolysable organic group functionalized with an epoxy group R' may be selected from the group consisting of an alkyl moiety; an ethyl moiety; a methyl moiety; a propyl moiety; a butyl moiety; a hexyl moiety; an octyl moiety; a benzyl moiety; a cyclohexyl moiety; and any combination thereof. The hydrolysable group X may be selected from the group consisting of an alkoxy moiety; a methoxy moiety; an ethoxy moiety; an acyloxy moiety; an amine moiety; a hydroxyl moiety; a halo moiety; an acetoxy moiety; a propoxy moiety; a butoxy moiety; a phenoxy moiety; a chloride moiety; a bromide moiety; an iodide moiety; a pentoxy moiety; and any combination thereof. Specific examples of suitable epoxy-functionalized alkoxysilanes for use as the liquid curable resin described herein may include, but are not limited to, a 3-(glycidoxypropyl)triethoxysilane; a (glycidoalkoxy)trialkoxysilane; 3-(glycidoxypropyl)trimethoxysilane; any derivative thereof; and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds. In some embodiments, the liquid curable resin may be present in the range of from a lower limit of about 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by weight of the consolidation composition.

In some embodiments, the liquid curing agent may include, but may not be limited to, a polyamine; a hydrophobically modified polyamine; a polyimine; a hydrophobically modified polyimine; a polyalcohol; hydrophobically modified polyacrylamide; a hydrophobically modified polyacrylate; and any combination thereof. In some embodiments, the specific liquid curing agent may be a polyethyleneimine or a hydrophobically modified polyethyleneimine. Hydrophobic modification may be achieved by any method known by those of skill in the art. In some embodiments, hydrophobic modification may be achieved by amidation with fatty acids (e.g., tallow-based fatty acids); quaternization with alkyl halides; an addition reaction of a long-chained alpha olefin; an addition reaction of a $C_{12}$-$C_{18}$ alkyl group; an addition reaction of a $C_8$-$C_{24}$ alkyl group; nucleophilic attack of an active site (e.g., a long-chained terminal expoxide); and any combination thereof. Hydrophobic modification may be preferred in some embodiments, as it may enhance the proppant pack conductivity due to association of hydrophobic groups. In some embodiments, the liquid curing agent may be present in the range of from a lower limit of about 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by weight of the consolidation composition. In some embodiments, it may be preferred to formulate the consolidation composition such that the liquid curable resin is present in relation to the liquid curing agent in a ratio of about 2:1.

In some embodiments, the consolidation compositions may further comprise a surfactant; a hydrolysable ester; a solvent; and any combination thereof. A surfactant may be used in the consolidation compositions described herein to facilitate coating of the consolidation composition onto a suitable substrate (e.g., proppant particulates and/or unconsolidated particulates). Any surfactant compatible with the consolidation compositions described herein may be used. Suitable surfactants may include, but are not limited to, an alkyl phosphonate surfactant (e.g., a $C_{12}$-$C_{22}$ alkyl phosphonate surfactant); an ethoxylated nonyl phenol phosphate ester; one or more cationic surfactants; and one or more nonionic surfactants; and any combination thereof. The surfactant or surfactants that may be used in the consolidation composition agent may be present in an amount in the range of a lower limit of about 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the consolidation composition.

A hydrolysable ester may be included in the consolidation compositions of the embodiments described herein to increase the porosity or permeability of a cured consolidation composition comprising proppant particulates or unconsolidated particulates because the hydrolysable ester will dissolve or otherwise become removed under certain conditions (e.g., after the elapse of certain time or under certain temperature conditions). Suitable examples of hydrolysable esters that may be used in the consolidation compositions may include, but are not limited to, dimethylglutarate; dimethyladipate; dimethylsuccinate; sorbitol; catechol; dimethylthiolate; methyl salicylate; dimethyl salicylate; dimethylsuccinate; ter-butylhydroperoxide; butyl lactate; and any combination thereof. When used, a hydrolysable ester may be included in the consolidation compositions in an amount in the range of a lower limit of about 0.1%, 0.25%, 0.5%, 1%, 1.25%, and 1.5% to an upper limit of about 3%, 2.75%, 2.5%, 2.25%, 2%, 1.75%, and 1.5% by weight of the consolidation composition. In some embodiments, a hydrolysable ester may be included in the consolidation composition in an amount in the range of about 1% to about 2.5% by weight of the consolidation composition.

An optional solvent may be included in the consolidation compositions to reduce the viscosity of the liquid resin agent (i.e., to enhance the pumpability of the liquid resin agent through subterranean formation operational equipment). Suitable solvents may include, but are not limited to, butyl lactate; butylglycidyl ether; dipropylene glycol methyl ether; dipropylene glycol dimethyl ether; dimethyl formamide; diethylene glycol methyl ether; ethyleneglycol butyl ether; diethylene glycol butyl ether; propylene carbonate; methanol; butyl alcohol; d'limonene; fatty acid methyl esters; isopropanol; 2-butyoxy ethanol; an ether of a C2 to C6 dihydric alkanol containing at least one C1 to C6 alkyl group; a monoether of dihydric alkanol; methoxypropanol; butoxyethanol; hexoxyethanol; any isomer thereof; and any combination thereof. In some embodiments, those solvents having high flash points of above about 125° F. may be preferred. It is within the ability of one skilled in the art, with the benefit of this disclosure, to determine if and how much solvent may be needed to achieve a suitable viscosity. In some embodiments, the amount of the solvent used in the consolidation compositions may be in the range of a lower limit of about 0.1%, 1%, 2.5%, 5%, 7.5%, 10%, 12.5%, and 15% to about 30%, 27.5%, 25%, 22.5%, 20%, 17.5%, and 15% by weight of the consolidation composition.

In some embodiments, the consolidation compositions may be introduced into a subterranean formation in a treatment fluid. The treatment fluid may include an aqueous treatment fluid; an aqueous-miscible treatment fluid; and any combination thereof. Suitable aqueous-based treatment fluids described in some embodiments herein may include, but are not limited to fresh water; saltwater (e.g., water containing one or more salts dissolved therein); brine (e.g., saturated saltwater); seawater; and any combination thereof. Suitable aqueous-miscible treatment fluids may include, but are not be limited to, an alcohol (e.g., methanol, ethanol, n-propanol, isopropanol, n-butanol, sec-butanol, isobutanol, and t-butanol); a glycerin; a glycol (e.g., polyglycols, propylene glycol, and ethylene glycol); a polyglycol amine; a polyol; any derivative thereof; any in combination with a salt (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous treatment fluid; and any combination thereof. Generally, the aqueous portion (i.e., the water) of the treatment fluids described (including both the aqueous treatment fluids and the aqueous-miscible treatment fluids) herein may be from any source, provided that it does not contain components that might adversely affect the stability and/or performance of the treatment fluids described herein. The consolidation compositions may be present in the range of from a lower limit of about 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by weight of the composition by weight of the treatment fluid.

In some embodiments, the treatment fluids comprising the consolidation compositions and/or the consolidation compositions themselves may additionally be foamed when they are introduced into the formation without the presence of proppant particulates. In other embodiments, when the treatment fluid comprises proppant particulates coated with the consolidation compositions described herein, the treatment fluids may be foamed, gelled, or both gelled and foamed.

In some embodiments, the treatment fluids described herein may comprise proppant particulates coated with the consolidation compositions disclosed in some embodiments herein and may be gelled by including a gelling agent and, optionally, a crosslinking agent. Suitable gelling agents may comprise polymers; synthetic polymers; and any combinations thereof. A variety of gelling agents can be used in conjunction with the embodiments described herein, including, but not limited to, hydratable polymers that contain one or more functional groups such as hydroxyl; cis-hydroxyl; carboxylic acids; derivatives of carboxylic acids; sulfate; sulfonate; phosphate; phosphonate; amino; or amide. In certain embodiments, the gelling agents may be polymers comprising polysaccharides, and derivatives thereof that contain one or more of these monosaccharide units including, but not limited to, galactose; mannose; glucoside; glucose; xylose; arabinose; fructose; glucuronic acid; or pyranosyl sulfate. Examples of suitable polymers include, but are not limited to, guar gum and derivatives thereof (e.g., hydroxypropyl guar and carboxymethylhydroxypropyl guar); carboxymethyl guar; and cellulose derivatives (e.g., carboxymethyl cellulose and hydroxyethyl cellulose). Additionally, synthetic polymers and copolymers that contain the above-mentioned functional groups may be used. Examples of such synthetic polymers may include, but are not limited to, polyacrylate; polymethacrylate; polyacrylamide; polyvinyl alcohol; polyvinylpyrrolidone; and any combinations thereof. In other embodiments, the gelling agent molecule may be depolymerized. As used herein, the term "depolymerized," generally refers to a decrease in the molecular weight of the gelling agent molecule. Suitable gelling agents may be present in the treatment fluids described herein in an amount in the range of from a lower limit of about 0.1%, 0.25%, 0.5%, 0.75%, 1%, 1.25%, 1.5%, 1.75%, 2%, 2.25%, and 2.5% to an upper limit of about 5%, 4.75%, 4.5%, 4.25%, 4%, 3.75%, 3.5%, 3.25%, 3%, 2.75%, and 2.5% by weight of the treatment fluid. In preferred embodiments, the gelling agents may be present in the treatment fluids described herein in an amount in the range of from about 0.01% to about 1% by weight of the treatment fluid.

Crosslinking agents may be used to crosslink gelling agent molecules to form crosslinked gelling agents. Crosslinking agents may comprise at least one ion that is capable of crosslinking at least two gelling agent molecules. Examples of suitable crosslinking agents may include, but are not limited to, boric acid; disodium octaborate tetrahydrate; sodium diborate; pentaborates; ulexite; colemanite; compounds that can supply zirconium IV ions (e.g., zirconium lactate, zirconium lactate triethanolamine, zirconium carbonate, zirconium acetylacetonate, zirconium malate, zirconium citrate, and zirconium diisopropylamine lactate); compounds that can supply titanium IV ions (e.g., titanium lactate, titanium malate, titanium citrate, titanium ammonium lactate, titanium triethanolamine, and titanium acetylacetonate); aluminum compounds (e.g., aluminum lactate or aluminum citrate); antimony compounds; chromium compounds; iron compounds; copper compounds; zinc compounds; and any combinations thereof. Suitable crosslinking agents generally are present in the treatment fluids described herein in an amount sufficient to provide, in-situ, the desired degree of crosslinking between gelling agent molecules. In certain embodiments, the crosslinking agents may be present in an amount in the range from a lower limit of about 0.001%, 0.01%, 0.1%, 0.5%, 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the treatment fluid comprising coated proppant particulates. In other embodiments, the crosslinking agents may be present in the treatment fluids described herein in an amount in the range from about 0.01% to about 1% by weight of the treatment fluid comprising coated proppant particulates. Individuals skilled in the art, with the benefit of this disclosure, will recognize the exact type and amount of crosslinking agent to use depending on factors such as the specific gelling agent used, desired viscosity, formation conditions, and the like.

The gelled or gelled and crosslinked treatment fluids comprising coated proppant particulates may additionally include a gel breaker, such as an enzyme breaker; oxidizing breaker; acid buffer breaker; or temperature-activated gel breaker. As used herein, the term "breaker" or "break" refers to causing a fluid to become less viscous in order to more easily remove it from a subterranean formation. The gel breakers cause the treatment fluids to revert to thin fluids that can be produced back to the surface after they have been used in a subterranean formation operation. The gel breaker may be present in the treatment fluids comprising coated proppant particulates described herein in an amount in the range of from a lower limit of about 0.01%, 0.1%, 0.5%, 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the gelling agent.

The consolidation composition itself, the treatment fluids comprising the consolidation composition without proppant particulates, and/or the treatment fluids comprising the consolidation composition coated onto proppant particulates may be foamed by including a gas and a foaming agent. As used herein, the term "foam" refers to a two-phase composition having a continuous liquid or solid phase and a discontinuous gas phase. Suitable gases for use in foaming the consolidation compositions or the treatment fluids described herein may include, but are not limited to, nitrogen; carbon dioxide; air; methane; helium; argon; and any combination thereof. One skilled in the art, with the benefit of this disclosure, will understand the benefit of each gas. By way of nonlimiting example, carbon dioxide foams may have deeper well capability than nitrogen foams because carbon dioxide foams have greater density than nitrogen gas foams so that the surface pumping pressure required to reach a corresponding depth is lower with carbon dioxide than with nitrogen.

In some embodiments, the gas may be present such that the consolidation composition or the treatment fluid exhibits a foam quality in the range from a lower limit of about 5%, 10%, 25%, 40%, 50%, 60%, or 70% gas volume to an upper limit of about 95%, 90%, 80%, 75%, 60%, or 50% gas volume, and wherein the foam quality of the consolidation composition or the treatment fluid may range from any lower limit to any upper limit and encompass any subset therebetween. Most preferably, the consolidation composition or the treatment fluid may have a foam quality from about 85% to about 95%, or about 90% to about 95%.

Suitable foaming agents for use in the embodiments described herein may include, but are not limited to, cationic foaming agents; anionic foaming agents; amphoteric foaming agents; nonionic foaming agents; or any combination thereof. Nonlimiting examples of suitable foaming agents may include, but are not limited to, surfactants like betaines; sulfated alkoxylates; sulfonated alkoxylates; alkyl quaternary amines; alkoxylated linear alcohols; alkyl sulfonates; alkyl aryl sulfonates; C10-C20 alkyldiphenyl ether sulfonates; polyethylene glycols; ethers of alkylated phenol; sodium dodecylsulfate; alpha olefin sulfonates (e.g., sodium dodecane sulfonate, trimethyl hexadecyl ammonium bromide, and the like); any derivative thereof; or any combination thereof. Foaming agents may be included at concentrations ranging from a lower limit of about 0.05%, 0.075%, 0.1%, 0.25%, 0.5%, and 0.75% to an upper limit of about 2%, 1.75%, 1.5%, 1.25%, 1%, and 0.075% by weight of the consolidation composition or the treatment fluid.

In some embodiments, the treatment fluids comprising the consolidation compositions may further comprise an additive including, but are not limited to, a weighting agent; a fluid loss control agent; an emulsifier; a dispersion aid; a corrosion inhibitor; a lost circulation material; a pH control additive; a biocide; a stabilizing agent; a chelating agent; a scale inhibitor; a mutual solvent; an oxidizer; a reducer; a friction reducer; a clay stabilizing agent; a breaker; and any combinations thereof.

Suitable proppant particulates for use according to the methods disclosed herein (e.g., that may be coated using the consolidation compositions described herein and that may form proppant packs in fractures) may comprise any material suitable for use in a subterranean operation and may include, but are not limited to, sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof. Suitable composite particulates may comprise a binder and a filler material wherein suitable filler materials may include, but is not limited to, silica; alumina; fumed carbon; carbon black; graphite; mica; titanium dioxide; meta-silicate; calcium silicate; kaolin; talc; zirconia; boron; fly ash; hollow glass microspheres; solid glass; and any combination thereof. The mean size of the proppant particulates generally may range from about 2 mesh to about 400 mesh on the U.S. Sieve Series, or even higher; however, in certain circumstances, other mean sizes may be desired and will be entirely suitable for practice of the present invention. In particular embodiments, the mean size distribution of the proppant particulates ranges are one or more of 6/12, 8/16, 12/20, 16/30, 20/40, 30/50, 40/60, 40/70, or 50/70 mesh. It should be understood that the term "proppant particulate" or "particulate," as used in this disclosure, includes all known shapes of materials, including substantially spherical materials; fibrous materials; polygonal materials (e.g., cubic materials); and any combination thereof. Moreover, fibrous materials may be included in certain embodiments of the present invention. In certain embodiments, the proppant particulates may be present in the treatment fluid in an amount in the range of from a lower limit of about 0.5 pounds per gallon ("ppg"), 1 ppg, 5 ppg, 10 ppg, and 15 ppg to an upper limit of about 30 ppg, 25 ppg, 20 ppg, and 15 ppg by volume of the treatment fluid.

In some embodiments, degradable particulates may comprise a portion of the proppant particulates such that they intermix with proppant particulates and form a portion of the proppant pack. Upon a triggering event, the degradable particulates may be degraded, leaving behind spaces in the proppant pack that may enhance the conductivity of a propped fracture. It may be desirable that the degradable particulates have similar particle size, shape, and specific gravity as those of the proppant particulates. Suitable degradable particulates may include, but are not limited to, oil-degradable polymers; degradable polymers; degradable salts; blends thereof; and any combinations thereof. In some embodiments, degradable particulates may be included in the treatment fluids from a lower limit of about 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10% to an upper limit of about 20%, 19.5%, 19%, 18.5%, 18%, 17.5%, 17%, 16.5%, 16%, 15.5%, 15%, 14.5%, 14%, 13.5%, 13%, 12.5%, 12%, 11.5%, 11%, 10.5%, and 10% by weight of the proppant particulates. In some embodiments, degradable particulates may be included in the treatment fluids from about 5% to about 15% by weight of the proppant particulates. One of ordinary skill in the art, with the benefit of this disclosure, will recognize whether to include degradable particulates and in what concentration to achieve the desired results.

In various embodiments, systems configured for preparing, transporting, and delivering the consolidation compositions described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey the consolidation compositions described herein. The pump may be, for example, a high pressure pump or a low pressure pump, which may depend on, inter alia, the viscosity and density of the consolidation compositions, the type of the cementing operation, and the like.

In some embodiments, the systems described herein may further comprise a mixing tank arranged upstream of the pump and in which the consolidation compositions is formulated. In various embodiments, the pump (e.g., a low pressure pump, a high pressure pump, or a combination thereof) may convey the consolidation compositions from the mixing tank or other source of the consolidation compositions to the tubular. In other embodiments, however, the consolidation compositions can be formulated offsite and transported to a worksite, in which case the consolidation compositions may be introduced to the tubular via the pump directly from a transport vehicle or a shipping container (e.g., a truck, a railcar, a barge, or the like) or from a transport pipeline. In yet other embodiments, the consolidation compositions may be formulated on the fly at the well site where components of the consolidation compositions are pumped from a transport (e.g., a vehicle or pipeline) and mixed during introduction into the tubular. In any case, the consolidation compositions may be drawn into the pump, elevated to an appropriate pressure, and then introduced into the tubular for delivery downhole.

FIG. 1 shows an illustrative schematic of a system that can deliver consolidation compositions of the disclosure to a downhole location, according to one or more embodiments. It should be noted that while FIG. 1 generally depicts a landbased system, it is to be recognized that like systems may be operated in subsea locations as well. As depicted in FIG. 1, system 1 may include mixing tank 10, in which a consolidation compositions of the embodiments described herein may be formulated. Again, in some embodiments, the mixing tank 10 may represent or otherwise be replaced with a transport vehicle or shipping container configured to deliver or otherwise convey the consolidation compositions to the well site. The consolidation compositions may be conveyed via line 12 to wellhead 14, where the consolidation compositions enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the consolidation compositions may subsequently return up the wellbore in the annulus between the tubular 16 and the wellbore 22 as indicated by flow lines 24. In other embodiments, the consolidation compositions may be reverse pumped down through the annulus and up tubular 16 back to the surface, without departing from the scope of the disclosure. Pump 20 may be configured to raise the pressure of the consolidation compositions to a desired degree before its introduction into tubular 16 (or annulus). It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 1 to provide for other cementing operations (e.g., squeeze operations, reverse cementing (where the cement in introduced into an annulus between a tubular and the wellbore and returns to the wellhead through the tubular), and the like).

It is also to be recognized that the disclosed consolidation compositions may also directly or indirectly affect the various downhole equipment and tools that may come into contact with the consolidation compositions during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: providing a consolidation composition comprising the reaction product of a liquid curable resin and a liquid curing agent, wherein the liquid curable resin is an epoxy-functionalized alkoxysilane and wherein the liquid curing agent is selected from the group consisting of: a polyamine; a hydrophobically modified polyamine; a polyimine; a hydrophobically modified polyimine; a polyalcohol; hydrophobically modified polyacrylamide; a hydrophobically modified polyacrylate; and any combination thereof; coating proppant particulates with the consolidation composition, thereby creating coated proppant particulates; introducing the coated proppant particulates into a subterranean formation and placing the coated proppant particulates into a fracture therein; and curing the consolidation composition so as to consolidate the coated proppant particulates in the fracture and form a proppant pack therein.

B. A method comprising: providing a portion of a subterranean formation comprising unconsolidated particulates; introducing a consolidation composition comprising the reaction product of a liquid curable resin and a liquid curing agent, wherein the liquid curable resin is an epoxy-functionalized alkoxysilane and wherein the liquid curing agent is selected from the group consisting of: a polyamine; a hydrophobically modified polyamine; a polyimine; a hydrophobically modified polyimine; a polyalcohol; hydrophobically modified polyacrylamide; a hydrophobically modified polyacrylate; and any combination thereof; introducing the consolidation composition into the portion of the subterranean formation so as to contact the unconsolidated particulates with the consolidation composition, thereby creating coated unconsolidated particulates; curing the consolidation composition so as to consolidate the coated unconsolidated particulates in the portion of the subterranean formation.

C. A method comprising: providing a portion of a subterranean formation comprising unconsolidated particulates; providing a liquid curable resin, wherein the liquid curable resin is an epoxy-functionalized alkoxysilane; providing a liquid curing agent, wherein the liquid curing agent is selected from the group consisting of: a polyamine; a hydrophobically modified polyamine; a polyimine; a hydrophobically modified polyimine; a polyalcohol; hydrophobically modified polyacrylamide; a hydrophobically modified polyacrylate; and any combination thereof; introducing the liquid curable resin into the portion of the subterranean formation; introducing the liquid curing agent into the portion of the subterranean formation; reacting the liquid curable resin and the liquid curing agent so as to form a consolidation composition; contacting the unconsolidated particulates with the consolidation composition, thereby creating coated unconsolidated particulates; curing the consolidation composition so as to consolidate the coated unconsolidated particulates in the portion of the subterranean formation.

Each of embodiments A and B may have one or more of the following additional elements in any combination:

Element 1: Wherein the step of: coating the proppant particulates with the consolidation composition, thereby creating coated proppant particulates and the step of: introducing the coated proppant particulates into a subterranean formation are performed simultaneously by placing the proppant particulates and the consolidation composition into a treatment fluid as it is introduced into the subterranean formation, wherein the proppant particulates are coated with the consolidation composition in the treatment fluid, thereby creating the coated proppant particulates.

Element 2: Wherein the consolidation composition is introduced into the portion of the subterranean formation in a treatment fluid at a rate and pressure sufficient to create or enhance at least one fracture therein.

Element 3: Wherein the epoxy-functionalized alkoxysilane has the formula: $R_nR'_mSiX_{(4-n-m)}$, wherein R is a nonhydrolysable organic group; R' is a nonhydrolysable organic group functionalized with an epoxy group; X is a hydrolysable group; n is an integer between 0 and 4; and m is an integer between 0 and 4.

Element 4: Wherein the nonhydrolysable organic group for use in the nonhydrolysable organic group R and the nonhydrolysable organic group functionalized with an epoxy group R' are selected from the group consisting of an alkyl moiety; an ethyl moiety; a methyl moiety; a propyl moiety; a butyl moiety; a hexyl moiety; an octyl moiety; a benzyl moiety; a cyclohexyl moiety; and any combination thereof.

Element 5: Wherein the hydrolysable group X is selected from the group consisting of an alkoxy moiety; a methoxy moiety; an ethoxy moiety; an acyloxy moiety; an amine moiety; a hydroxyl moiety; a halo moiety; an acetoxy moiety; a propoxy moiety; a butoxy moiety; a phenoxy moiety; a chloride moiety; a bromide moiety; an iodide moiety; a pentoxy moiety; and any combination thereof.

Element 6: Wherein the consolidation composition further comprises a surfactant; a hydrolysable ester; a solvent; and any combination thereof.

Element 7: Wherein the unconsolidated particulates are proppant particulates in a proppant pack in a fracture.

Element 8: Wherein the consolidation composition is introduced into the portion of the subterranean formation as a pill.

By way of non-limiting example, exemplary combinations applicable to A and B include: A with 1, 3, and 6; B with 2, 4, 5, and 9; and C with 3, 5, and 7.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
providing a consolidation composition comprising the reaction product of a liquid curable resin and a liquid curing agent,
wherein the liquid curable resin is an epoxy-functionalized alkoxysilane, and
wherein the liquid curing agent is selected from the group consisting of: a hydrophobically modified polyamine; a hydrophobically modified polyimine; hydrophobically modified polyacrylamide; a hydrophobically modified polyacrylate; and any combination thereof, and
wherein the liquid curing agent is present in the range of from about 0.1% to about 10% by weight of the consolidation composition;
coating proppant particulates with the consolidation composition, thereby creating coated proppant particulates;
introducing the coated proppant particulates into a subterranean formation and placing the coated proppant particulates into a fracture therein; and
curing the consolidation composition so as to consolidate the coated proppant particulates in the fracture and form a proppant pack therein.

2. The method of claim 1, wherein the consolidation composition further comprises a surfactant; a hydrolysable ester; a solvent; and any combination thereof.

3. The method of claim 1, wherein the step of: coating the proppant particulates with the consolidation composition, thereby creating coated proppant particulates and the step of: introducing the coated proppant particulates into a subterranean formation are performed simultaneously by placing the proppant particulates and the consolidation composition into a treatment fluid as it is introduced into the subterranean formation, wherein the proppant particulates are coated with the consolidation composition in the treatment fluid, thereby creating the coated proppant particulates.

4. The method of claim 3, wherein the treatment fluid is introduced into the subterranean formation at a rate and pressure sufficient to create or enhance the fracture.

5. The method of claim 1, wherein the epoxy-functionalized alkoxysilane has the formula: $R_nR'_mSiX_{(4-n-m)}$, wherein R is a nonhydrolysable organic group; R' is a nonhydrolysable organic group functionalized with an epoxy group; X is a hydrolysable group; n is an integer between 0 and 4; and m is an integer between 0 and 4.

6. The method of claim 5, wherein the nonhydrolysable organic group for use in the nonhydrolysable organic group R and the nonhydrolysable organic group functionalized with an epoxy group R' are selected from the group consisting of an alkyl moiety; an ethyl moiety; a methyl moiety; a propyl moiety; a butyl moiety; a hexyl moiety; an octyl moiety; a benzyl moiety; a cyclohexyl moiety; and any combination thereof.

7. The method of claim 5, wherein the hydrolysable group X is selected from the group consisting of an alkoxy moiety; a methoxy moiety; an ethoxy moiety; an acyloxy moiety; an amine moiety; a hydroxyl moiety; a halo moiety; an acetoxy moiety; a propoxy moiety; a butoxy moiety; a phenoxy moiety; a chloride moiety; a bromide moiety; an iodide moiety; a pentoxy moiety; and any combination thereof.

8. A method comprising:
providing a portion of a subterranean formation comprising unconsolidated particulates;

introducing a consolidation composition comprising the reaction product of a liquid curable resin and a liquid curing agent,
wherein the liquid curable resin is an epoxy-functionalized alkoxysilane,
wherein the liquid curing agent is selected from the group consisting of: a hydrophobically modified polyamine; a hydrophobically modified polyimine; hydrophobically modified polyacrylamide; a hydrophobically modified polyacrylate; and any combination thereof, and
wherein the liquid curing agent is present in the range of from about 0.1% to about 10% by weight of the consolidation composition;
introducing the consolidation composition into the portion of the subterranean formation so as to contact the unconsolidated particulates with the consolidation composition, thereby creating coated unconsolidated particulates;
curing the consolidation composition so as to consolidate the coated unconsolidated particulates in the portion of the subterranean formation.

9. The method of claim 8, wherein the unconsolidated particulates are proppant particulates in a proppant pack in a fracture.

10. The method of claim 8, wherein the consolidation composition is introduced into the portion of the subterranean formation in a treatment fluid at a rate and pressure sufficient to create or enhance at least one fracture therein.

11. The method of claim 8, wherein the consolidation composition is introduced into the portion of the subterranean formation as a pill.

12. The method of claim 8, wherein the consolidation composition further comprises a surfactant; a hydrolysable ester; a solvent; and any combination thereof.

13. The method of claim 8, wherein the epoxy-functionalized alkoxysilane has the formula: $R_nR'_mSiX_{(4-n-m)}$, wherein R is a nonhydrolysable organic group; R' is a nonhydrolysable organic group functionalized with an epoxy group; X is a hydrolysable group; n is an integer between 1 and 4; and m is an integer between 1 and 4.

14. The method of claim 13, wherein the nonhydrolysable organic group for use in the nonhydrolysable organic group R and the nonhydrolysable organic group functionalized with an epoxy group R' are selected from the group consisting of an alkyl moiety; an ethyl moiety; a methyl moiety; a propyl moiety; a butyl moiety; a hexyl moiety; an octyl moiety; a benzyl moiety; a cyclohexyl moiety; and any combination thereof.

15. The method of claim 13, wherein the hydrolysable group X is selected from the group consisting of an alkoxy moiety; a methoxy moiety; an ethoxy moiety; an acyloxy moiety; an amine moiety; a hydroxyl moiety; a halo moiety; an acetoxy moiety; a propoxy moiety; a butoxy moiety; a phenoxy moiety; a chloride moiety; a bromide moiety; an iodide moiety; a pentoxy moiety; and any combination thereof.

16. A method comprising:
providing a portion of a subterranean formation comprising unconsolidated particulates;
providing a liquid curable resin,
wherein the liquid curable resin is an epoxy-functionalized alkoxysilane;
providing a liquid curing agent,
wherein the liquid curing agent is selected from the group consisting of: a hydrophobically modified polyamine; a hydrophobically modified polyimine; hydrophobically modified polyacrylamide; a hydrophobically modified polyacrylate; and any combination thereof;
introducing the liquid curable resin into the portion of the subterranean formation;
introducing the liquid curing agent into the portion of the subterranean formation;
reacting the liquid curable resin and the liquid curing agent so as to form a consolidation composition,
wherein the liquid curing agent is present in the range of from about 0.1% to about 10% by weight of the consolidation composition;
contacting the unconsolidated particulates with the consolidation composition, thereby creating coated unconsolidated particulates;
curing the consolidation composition so as to consolidate the coated unconsolidated particulates in the portion of the subterranean formation.

17. The method of claim 16, wherein the consolidation composition further comprises a surfactant; a hydrolysable ester; a solvent; and any combination thereof.

18. The method of claim 16, wherein the epoxy-functionalized alkoxysilane has the formula: $R_nR'_mSiX_{(4-n-m)}$, wherein R is a nonhydrolysable organic group; R' is a nonhydrolysable organic group functionalized with an epoxy group; X is a hydrolysable group; n is an integer between 0 and 4; and m is an integer between 0 and 4.

19. The method of claim 18, wherein the nonhydrolysable organic group for use in the nonhydrolysable organic group R and the nonhydrolysable organic group functionalized with an epoxy group R' are selected from the group consisting of an alkyl moiety; an ethyl moiety; a methyl moiety; a propyl moiety; a butyl moiety; a hexyl moiety; an octyl moiety; a benzyl moiety; a cyclohexyl moiety; and any combination thereof.

20. The method of claim 18, wherein the hydrolysable group X is selected from the group consisting of an alkoxy moiety; a methoxy moiety; an ethoxy moiety; an acyloxy moiety; an amine moiety; a hydroxyl moiety; a halo moiety; an acetoxy moiety; a propoxy moiety; a butoxy moiety; a phenoxy moiety; a chloride moiety; a bromide moiety; an iodide moiety; a pentoxy moiety; and any combination thereof.

* * * * *